May 23, 1944. A. AMSTUTZ 2,349,691
STRAINER HOLDER
Filed Feb. 12, 1944
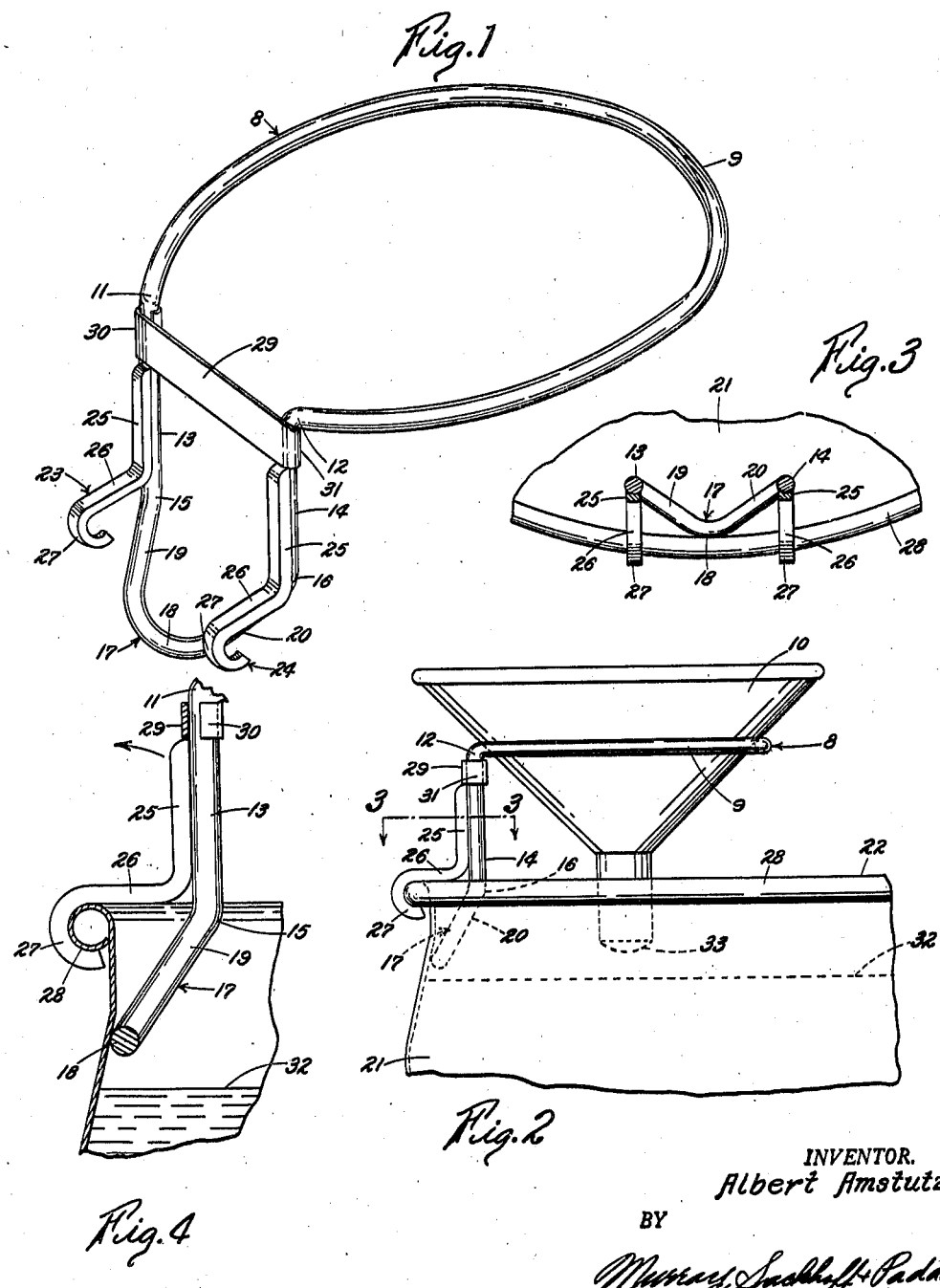
INVENTOR.
Albert Amstutz
BY
ATT'YS Patented May 23, 1944

2,349,691

UNITED STATES PATENT OFFICE 2,349,691

STRAINER HOLDER

Albert Amstutz, Bowling Green Township, Marion County, Ohio

Application February 12, 1944, Serial No. 522,111

4 Claims. (Cl. 248—94)

The present invention relates to improvements in detachable brackets and is particularly directed to a holder for strainers or the like, which securely mounts said strainer in spaced relationship above the mouth of a storage container for the strained liquids.

It is an object of the invention to provide a detachable strainer holder of simplified and rugged construction, which has a three point mounting means for engagement with a wall of a storage container to securely hold a strainer in spaced relation above the container mouth to effect a substantial clearance between the discharge end of said strainer and the liquid level in the said container.

Another object of the invention is to provide a strainer holder which may be readily detached a strainer holder which may be readily detached or mounted on the side wall of a storage container, or the like.

Other objects will be apparent from the following description taken in connection with the accompanying drawing, in which:

Fig. 1 is a perspective view of my strainer holder.

Fig. 2 is a fragmental, elevational view of my strainer holder illustrating its operative position upon a storage container for strained liquids.

Fig. 3 is a cross-sectional view taken on line 3—3 of Fig. 2.

Fig. 4 is an enlarged cross-sectional view taken through the vertical center of the three point suspension means for the holder illustrated in Fig. 2.

The embodiment of my invention consists of a bracket or strainer holder which has an open loop member 9, for encircling an article to be supported thereby, and which may be a funnel-shaped strainer 10, illustrated in Fig. 2. The free ends 11 and 12 of the open loop member are turned downwardly, and are integrally joined to vertical straight members 13 and 14 respectively. These straight members are disposed in a common plane which is at right angles to the plane of the open loop member. The lower ends 15 and 16 of the straight portions 13 and 14 respectively are connected by a bowed member 17, which comprises an arcuate shaped mid portion 18, which is integrally connected to said straight portions 19 and 20 respectively.

The bowed member is disposed in a plane acutely angular to the common plane of the said straight members, and is inclined outwardly from the straight members in a direction opposed to the extension of the open loop member 9. As illustrated in Fig. 2, the mid portion 18 of the bowed member, bears against the inner wall of a storage container 21 in a position adjacent the circular mouth 22 of said container.

It will therefore be noted that the various structural elements so far described are made from a single strand of relatively heavy round metal stock, said elements consisting of an open loop member which is preferably circular in plan, two vertical straight members joined to the free ends of the loop member and a bowed member depending from and integrally joining the lower ends of said straight members.

The means for operatively positioning the bracket on a container consists of two bracket supports generally indicated by reference numerals 23 and 24. Each of these supports has a vertically disposed bar 25, which is welded or otherwise fastened to the outer side of the straight portions 13 and 14. An integral arm 26 projects at right angles from the lower end of the bar 25, and is disposed in the common plane of the said bars and the straight members. The end of each arm terminates in circular hooks 27, which in operative position engage the rolled edge 28, formed around the mouth 22 of the container 21.

As most clearly indicated in Figs. 3 and 4, the common axial centers of the hooks 27 are in proximate relationship above the mid portion 18 of the bowed member 17. This bowed portion is also centered with respect to the vertical extension lines of the said hook portions. This construction effects a rigid and stable three-point suspension of the bracket when it is in operative position upon a container 21, for the mid portion bears outwardly against the interior wall of the container while the hooks are pulled inwardly against the edge 28 of said container at two points located above, and to each side of, the vertical extension of the mid portion contact with said side wall.

A cross strap 29 is provided to maintain the mid portion of the round stock under constant tension and to reenforce the open loop member when said bracket is employed to support conically shaped articles, such as the funnel shaped strainer 10, illustrated in Fig. 2, said strap consisting of two end engagement members 30 and 31, which encircle the straight portions 13 and 14 respectively between the upper terminations of the bars 25 and the intersection of said straight members and the open loop member. These strap engagement members may be welded or soldered to the straight members, if desired.

As indicated by the arrow shown in Fig. 4, my strainer holder may be readily removed or attached to the edge of the container by grasping the mid portion of the open loop member, which is opposed to the supporting end of said member to position the bracket on said container. It is only necessary to manually insert the edge of the container between the hooks and the bowed portion, and then permit the bracket to drop into its operative position. Removal of the bracket is effected by grasping the said mid portion of the loop member and moving said loop member in the direction of the arrow until the hooks disengage the edge of the container, and then moving the bracket upwardly to permit the edge to move through the space between the said mid portion 18 and the lower edges of the hooks.

My bracket is particularly adapted for use on a container such as a storage vessel for straining liquids, which is a part of a cream separator or the like. It will be noted that said bracket may be effectively positioned around a narrow area adjacent the mouth of said container, so that the bowed portion 20 will not come in contact with the strained milk 32, held in the container, and said bracket securely holds the strainer in spaced relationship above the milk level, so that the lower strainer mouth 33 does not come in contact with the milk level.

What is claimed is:

1. A bracket for the purposes described, comprising an open loop member, straight members depending from the free ends of the loop member, a bowed end member connecting the lower extremities of the straight members and disposed in a plane acutely angular to the common plane of the said straight members, and a bracket support fastened to each straight member and terminating in an end hook, said hooks being disposed above and in spaced relationship with the said bowed end member.

2. A bracket for the purposes described comprising an open loop member, straight members depending from the free ends of the loop member, a bowed end member connecting the lower extremities of the straight members and disposed in a plane acutely angular to the common plane of the said straight members, a bracket support for each straight member, consisting of a bar fastened to the straight member, an angularly disposed arm extending from the bar, and an end hook on the bar disposed in superposed, spaced relationship with the bowed end member, and a cross strap having end engagement members for encircling the straight members between the upper termination of the bars and the intersection of said straight members and the open loop member.

3. A bracket for the purposes described comprising an open loop member, straight members depending at right angles from the free ends of the loop members, a bowed end member depending outwardly from the lower extremities of the straight members and disposed in a plane acutely angular to the common plane of said straight members, and a bracket support for each straight member consisting of a bar fastened to the outer side of said straight member, an arm extending outwardly from the bar and disposed in an offset plane parallel to the plane of the loop member, and an end hook on the arm disposed in close proximity above the bowed member, the mid portion of said bowed member being disposed between the vertical extension lines of said hooks.

4. A bracket for the purposes described comprising an open loop member, straight members depending at right angles from the free ends of the loop member, a bowed end member depending outwardly from the lower extremities of the straight members and disposed in a plane acutely angular to the common plane of said straight members, a bracket support for each straight member consisting of a bar fastened to the outer side of said straight member, an arm extending outwardly from the bar and disposed in an offset plane parallel to the plane of the loop member, and an end hook on the arm disposed in close proximity above the bowed member, the mid portion of said bowed member being disposed between the vertical extension lines of said hooks, and a cross-strap having end engagement members for encircling the straight members between the upper termination of the bars and the intersection of said straight members and the open loop member.

ALBERT AMSTUTZ.